United States Patent [19]
Soran

[11] 4,172,901
[45] Oct. 30, 1979

[54] METHOD FOR DENATURING FOOD PRODUCTS USING A MARKING AGENT BORNE BY A CARRIER AGENT IMMISCIBLE WITH SAID FOOD PRODUCTS

[75] Inventor: Robert L. Soran, Modesto, Calif.

[73] Assignee: Beatrice Foods, Modesto, Calif.

[21] Appl. No.: 868,538

[22] Filed: Jan. 11, 1978

[51] Int. Cl.$^2$ ............................................. A22C 13/00
[52] U.S. Cl. ................................. 426/250; 252/365; 264/75; 426/132; 426/442; 426/540; 426/652
[58] Field of Search ............... 426/132, 250, 540, 640, 426/652, 442; 264/75, 77; 252/365

[56] References Cited

U.S. PATENT DOCUMENTS

| | | | |
|---|---|---|---|
| 1,859,467 | 5/1932 | Rath | 426/87 |
| 2,246,770 | 6/1941 | Wessel | 426/87 |
| 2,246,871 | 6/1941 | Balch | 107/54 |
| 2,284,651 | 6/1942 | Gundlach et al. | 107/54 |
| 2,293,538 | 8/1942 | Friedman | 107/1 |
| 2,334,052 | 11/1943 | Wedin | 107/54 |
| 2,774,314 | 12/1956 | Moser | 107/1 |
| 2,858,217 | 10/1958 | Benson | 426/93 |
| 2,885,291 | 5/1959 | Sengelaub et al. | 426/383 |
| 3,080,123 | 3/1963 | Erns | 239/230 |
| 3,592,940 | 7/1971 | Quesada | 426/540 |
| 3,677,691 | 7/1972 | Koch | 426/540 X |
| 3,851,075 | 11/1974 | Wisdom | 426/250 |
| 3,876,743 | 4/1975 | Soderlund | 264/75 |
| 3,901,641 | 8/1975 | Onder | 425/406 |
| 3,943,262 | 3/1976 | Winkler et al. | 426/250 |

*Primary Examiner*—Robert L. Lindsay, Jr.
*Attorney, Agent, or Firm*—Huebner & Worrel

[57] ABSTRACT

A method for denaturing a food product including the steps of intermixing a marking agent and a carrier agent which is immiscible with the food product at ambient temperature; heating the resultant mixture above ambient temperature to make the mixture flowable; and applying the mixture to the food product; and an apparatus for performing the method including a mechanism for intermixing the marking and carrier agents; a pump system connected to the mechanism and operable to pump the mixture from the mechanism into contact with the food product; and a heating system communicating with the mechanism and the pump system operable to heat the mixture above ambient temperature to impart flowability to the mixture.

9 Claims, 1 Drawing Figure

METHOD FOR DENATURING FOOD PRODUCTS USING A MARKING AGENT BORNE BY A CARRIER AGENT IMMISCIBLE WITH SAID FOOD PRODUCTS

BACKGROUND OF THE INVENTION

1. Field Of The Invention

The present invention relates to a method and apparatus for denaturing food products using a marking agent borne by a carrier agent immiscible with said food product and more particularly to such a method and apparatus which permit heretofore unusable substances to be employed as a carrier agent for a dye in denaturing a food product to preclude diffusion of the dye in the food product thereby insuring that a minimum quantity of dye is required in the denaturing operation while simultaneously insuring that a striking visual contrast is maintained between the dye and the food product.

The applicant's co-pending patent application entitled "Method and Apparatus For Denaturing Food Products Not Intended For Human Consumption", Ser. No. 664,149, filed Mar. 5, 1976, hereinafter referred to as "application Ser. No. 664,149", discloses a method and apparatus for denaturing food products by streaking the food products with a dye or other marking agent. As disclosed in that patent application, the applicant has discovered that by striping, streaking, or otherwise intermittently dying portions of flowable meat material, such material can be marked to denote that it is unfit for human consumption utilizing significantly reduced quantities of dye and achieving a high degree of visual contrast between the natural color of the meat and the dye material. The present invention constitutes an improvement in the method and apparatus of that invention as well as significant advance over prior art practices in the denaturing of food products.

2. Description Of The Prior Art

"Denaturing" is the process by which food products are marked to indicate that they are not fit for human consumption. While the products may be well suited to other uses, government regulations require that such products be denatured to avoid inadvertent human consumption. Heretofore water based dyes have been employed as the marking agents in denaturing food products. Since most food products contain high percentages by volume of water, the dye has tended to diffuse throughout the food mass. This problem is particularly pronounced in the denaturing of meat, such as beef, poultry and fish, which is itself at least 70 percent water. Prior art practice has called for the meat to be comminuted and the entire meat mass so formed to be dyed. Diffusion of the dye within the meat mass has caused the visual intensity of the dye to be significantly depleted. In many cases the extent of the diffusion has been such that the color of the denatured meat has not appeared appreciably different from natural coloration. Another difficulty encountered where such diffusion occurs has been that considerably more dye per volume of meat has been required than desired to achieve a given denaturing effect. Thus, the dye, which is expensive when used in the quantities required in an effort to overcome the effect of diffusion, has not been used efficiently.

Therefore, it has long been known that it would be desirable to have a method and apparatus for denaturing food products which preclude the diffusion of the marking agent in the food product, which insure that a minimum quantity of the marking agent is required to denature a given volume of food, and which employ the marking agent at maximum efficiency in achieving striking visual contrast between the food mass and the marking agent as a result of the denaturing process.

SUMMARY OF THE INVENTION

An object of the present invention is, therefore, to provide an improved method and apparatus for denaturing food products.

Another object is to provide such a method and apparatus which are particularly well suited to the denaturing of food products by marking the food mass with substances to form streaks, stripes, marking or the like and which prevent diffusion of the marking substances throughout the food mass, as is characteristic of prior art practices, to retain a striking visual contrast between the marking substances and the food mass.

Another object is to provide such a method and apparatus wherein a carrier agent is employed which is immiscible with the food products under ambient conditions, but which, when subjected to controlled conditions varying from ambiency, becomes temporarily flowable for application to the food product.

Another object is to provide such a method and apparatus which possess particular utility in the denaturing of meat which is unfit for human consumption, but which can be used for consumption by animals and the method employs a carrier agent which is edible by animals.

Another object is to provide such a method and apparatus which utilize a substance as the carrier agent, such as tallow, fat, oil or a similar substance which is commonly available at meat processing plants but which would otherwise be disposed of thereby to provide a use for such waste or economical substances and to minimize the cost of the denaturing operation.

Another object is to provide such a method and apparatus wherein the quantity of marking agent or dye required in the denaturing operation for a given quantity of food to be denatured is significantly less than has heretofore been possible and yet the resultant denatured product possesses a striking visual appearance to insure instantaneous identification.

Further objects and advantages are to provide improved elements and arrangements thereof in an apparatus and improved steps and sequences thereof in a method for the purposes described which are dependable, economical, durable and fully effective in accomplishing their intended purposes.

DESCRIPTION OF THE PREFERRED EMBODIMENT

Figure 1:
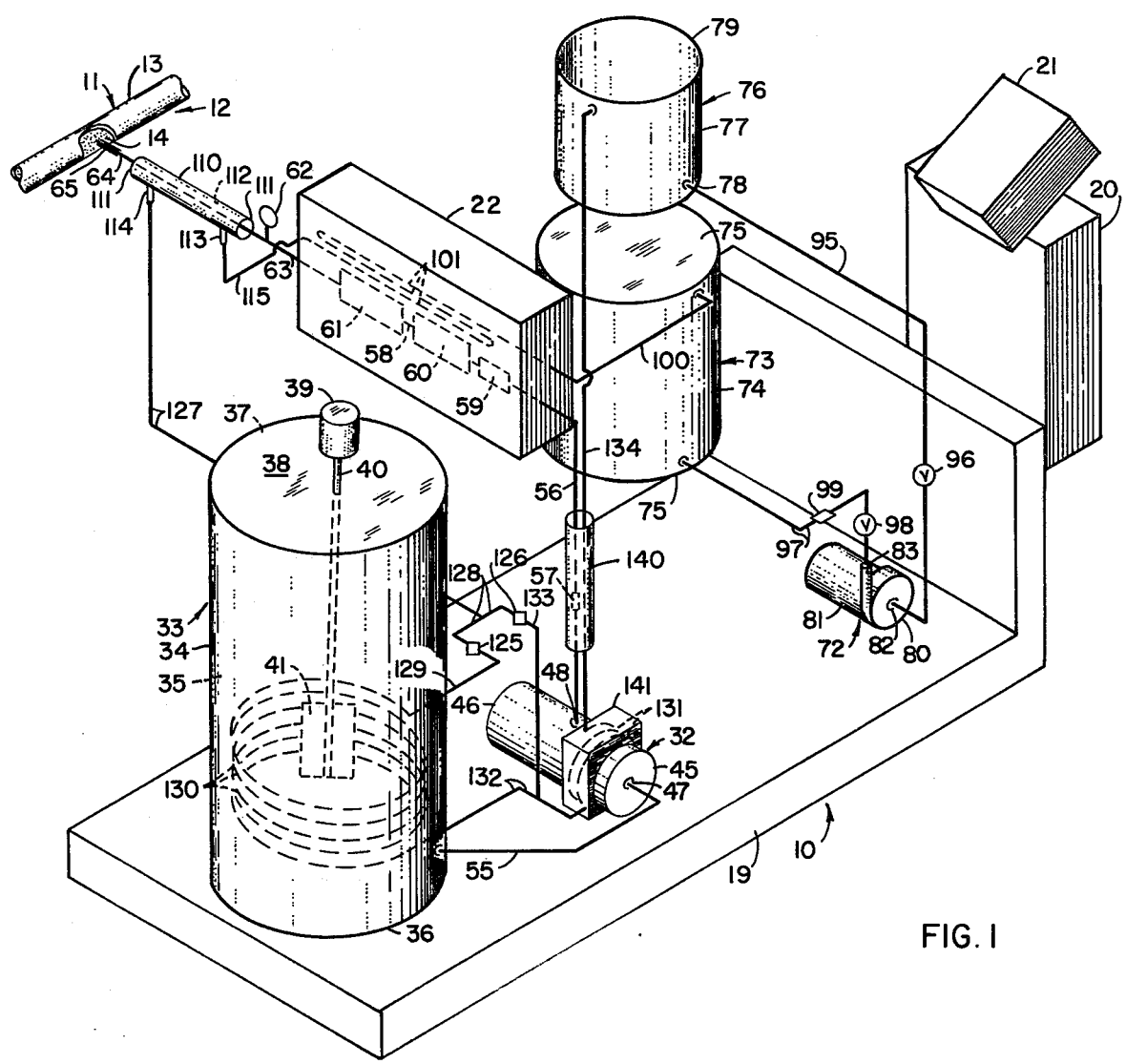
FIG. 1 is a perspective schematic diagram of the preferred embodiment of the apparatus for denaturing food products of the present invention.

Referring more particularly to the drawing, the apparatus of the present invention is generally indicated by the numeral 10. The apparatus 10 is adapted to be operated in conjunction with a device which transports a flowable food product along a path of travel. Such a device is indicated at 11 wherein it is shown fragmentarily. Such a device is also disclosed in greater detail in the applicant's aforementioned co-pending patent application Ser. No. 664,149 now U.S. Pat. No. 4,114,526.

However, the device of that application additionally discloses equipment for mixing and applying dye which the apparatus 10 of the present invention would replace. In any event, the device 11 has a food product or meat transporting system 12 which is fragmentarily shown. For illustrative convenience, comminuted meat will hereinafter be referred to as the specific food product to be denatured although it will be understood that virtually any flowable food product can be denatured in the manner to be described. The system has a conduit or nozzle 13 through which a flowable mass 14 of comminuted meat is propelled for purposes of denaturing.

The apparatus 10 has a frame 19 of suitable, rigid construction which can be mounted either in fixed position or adapted for earth traversing movement as is most suited to the purposes of the operator. An electrical box 20 is fastened on the frame 19 at a convenient location and has a control panel 21 mounted thereon. A metering control box 22 is mounted on the frame and contains components hereinafter to be described. It will be understood that the apparatus 10 has a suitable electrical system, not shown, operatively interconnecting the electrical box, control panel and the various other electrical components to be described. Preferably, but not necessarily, the electrical system can be connected to the device 11 so that the passage of the meat mass 14 through the transporting system 12 can be controlled from the control panel 21.

The apparatus 10 has a tallow pumping system generally indicated at 32. Although in its preferred embodiment tallow is employed as a carrier agent which is pumped through the system, a variety of other carrier agents such as other fats, oils, and the like can be employed in the practice of the method of the present invention. Tallow shall be understood to represent all other such carrier agents when referred to herein. The tallow pumping system has a tallow tank 33 mounted on the frame 19 in upstanding attitude. The tank has a cylindrical side wall 34 defining an interior 35 for the tank. The tank has a sealed lower end 36 and an opposite open upper end 37. The upper end of the tank is adapted to receive a lid 38 in fitted, but removable relation. A mixing motor 39 is affixed on the lid. The motor mounts a shaft 40 which extends through the lid into the interior 35 of the tank to a position adjacent to the lower end 36 thereof. The shaft mounts a suitable mixing head 41 adjacent to the lower end of the tank which is driven by the motor through the shaft.

A screw pump 45 is borne by the frame in relative proximity to the tallow tank 33. An electric drive motor 46 is affixed on the pump in driving relation thereto. The pump has an axial intake coupling 47 and a radial discharge coupling 48. In the conventional fashion the pump operates to draw material through the intake coupling of the pump and to expel the material from the pump through the discharge coupling.

The tallow pumping system 32 includes a first tallow conduit 55 which is mounted on the side wall 34 of the tallow tank 33 in close proximity to the lower end 36 of the tank. The first tallow conduit extends to and interconnects with the intake coupling 47 of the screw pump 45 in fluid supplying relation. A second tallow conduit 56 is secured on the discharge coupling 48 of the screw pump and extends upwardly therefrom. A strainer 57 of suitable construction is mounted on the second tallow conduit internally thereof so as to strain the materials passed therealong in a vertical path of travel. A third tallow conduit 58 is affixed to the upper end of the second tallow conduit and extends longitudinally through the metering control box 22.

A flow switch 59 is mounted on the third tallow conduit 58 within the metering control box 22 in controlling relation to fluids passed along the conduit. The flow switch is an electrically operated switch connected to an electrical circuit of the electrical system, not shown. The flow switch is a normally open switch or, in other words, the electrical circuit is normally not complete through the flow switch. Liquid passing along the tallow conduit 58, is detected by the flow switch which causes the switch to close thereby completing the electrical circuit through the switch. When the electrical circuit is completed through the flow switch, the meat transporting system 12 is activated to propel the meat mass 14 along the conduit 13. Breaking of the electrical circuit by opening of the flow switch, causes the meat transporting system to discontinue operation. Thus, the meat transporting system operates only so long as the flow switch registers that tallow is being transported along the tallow conduit 59.

A flow meter 60, such as the flow meter sold under the "Badger" trademark, is mounted on the third tallow conduit within the metering control box 22 preferably "downstream" from the flow switch 59. The flow meter is connected through a circuit of the electrical system to the control panel 21 and is operable to register at the control panel the quantity of tallow metered therethrough. The flow meter will thus record the quantity of tallow injected into a given quantity of the meat mass 14. For example, it has been found that one and one half (1½) pints of tallow injected into fifty (50) pounds of meat is well suited to the practice of the method of the present invention.

A pressure switch 61 is mounted on the third tallow conduit 58 preferably "downstream" from the flow meter 60. The pressure switch is an electrically operated switch which is connected to the electrical circuit preferably in series with the flow switch 59. The pressure switch is a normally closed switch or, in other words, the electrical circuit is normally complete through the pressure switch. However, when the pressure of the tallow within the tallow conduit reaches a predetermined upper limit, such as two hundred (200) pounds per square inch, it is detected by the pressure switch causing the switch to be thrown open and breaking the electrical circuit therethrough. This causes operation of the meat transporting system to be immediately terminated. Since the flow switch 59 and pressure switch 61 are preferably wired in series relation, the meat transporting system is not activated by the flow switch until tallow is passed along the tallow conduit and operation of the meat transporting system is terminated if the pressure within the tallow conduit reaches the upper limit.

With respect to the tallow conduit 58, the flow switch 59, flow meter 60, and pressure switch 61 are mounted on conduit 58 in series relation within the metering control box 22 to control the passage of fluid along the conduit. A pressure gauge 62 is affixed on the tallow conduit 58 outside of the metering control box 22 and adjacent to the remote end of that conduit. The gauge is operable to register and indicate to an observer the fluid pressure within the interior of the conduit.

A fourth tallow conduit 63 is mounted on the third tallow conduit 58 adjacent to the pressure gauge 62. Tallow conduit 63 has a remote end 64 which is adapted for connection to the conduit 13 of the meat transporting system 12. An injector 65 is fastened on the remote end 64 of tallow conduit 63 for communication with the meat mass 14 which is passed along conduit 13 of the meat transporting system.

The apparatus 10 has a glycol pumping system generally indicated at 72. The particular fluid employed as a heat transferring agent in the practice of the method of the present invention can be glycol, water, a mixture of glycol and water, or any other suitable heat transferring agent. In this sense the designation of the pumping system as a "glycol pumping system" is not intended to be restrictive. However, in the preferred embodiment, a suitable mixture of glycol and water is employed. The glycol pumping system has a glycol heater 73 which is mounted on the frame 19 of the apparatus 10 preferably adjacent to and below the metering control box 22. The glycol heater can be of any conventionally available type and has a cylindrical side wall 74 and sealed opposite ends 75. A glycol mixing tank 76 is affixed on the frame above the glycol heater. The mixing tank has a cylindrical side wall 77, a sealed bottom wall 78 and an opposite upper opening 79. A glycol pump 80 is fastened on the frame. An electric drive motor 81 is mounted on the glycol pump in driving relation thereto. The pump 80 has an axial intake coupling 82 and a discharge coupling 83.

A first glycol conduit 95 is secured on the bottom wall 78 of the glycol mixing tank 76 in communication with the interior thereof. The glycol conduit 95 is affixed at its opposite end on and in communication with the intake coupling 82 of the glycol pump 80. A shut-off valve 96 is mounted on the glycol conduit 95 in controlling relation to fluid passed along the conduit to afford the capability of terminating fluid flow. A second glycol conduit 97 is united with the discharge coupling 83 of the glycol pump in fluid receiving relation. The opposite end of the glycol conduit is fastened on the side wall 74 of the glycol heater 73 in communication with the interior of the heater and adjacent to the lower opposite end 75. A shut-off valve 98 is mounted on the glycol conduit 97 in controlling relation to fluid passed therealong. Thus, using the valves 96 and 98, the glycol pump 80 can be isolated from the rest of the glycol pumping system 72, if desired. A strainer 99 is fastened on the glycol conduit 97 between the shut-off valve 98 and the glycol heater for straining fluids passed along the conduit. A third glycol conduit 100 is mounted at one of its ends on the side wall 74 of the glycol heater 73 adjacent to the upper opposite end 75 in receiving relation to fluid from the glycol heater. The glycol conduit 100 extends into the metering control box 22. A heating coil 101 is mounted on the glycol conduit 100 in receiving relation to fluid supplied therefrom and extends longitudinally of the interior of the metering control box in relatively close proximity to the third tallow conduit 58 to enhance heat transfer therebetween.

A heating conduit or jacket 110, having sealed ends 111 is received on and extends about the fourth tallow conduit 63 between the gauge 62 and the injector 64. The jacket has an interior 112 through which the conduit 63 is extended. The conduit 63 extends substantially axially through the interior of the heating jacket between its sealed ends. An intake coupling 113 is provided on the jacket adjacent to the heating gauge. A discharge coupling 114 is provided on the heating jacket adjacent to the injector. A fourth glycol conduit 115 is connected to the heating coil 101 within the metering control box in receiving relation to fluid therewithin. The glycol conduit 115 is secured at its opposite end on the intake coupling 113 of the heating jacket.

First and second electrically operated solenoid valves 125 and 126 respectively are affixed at any suitable location on the apparatus 10, such as in side-by-side relation on the frame 19 or the side wall 34 of the tallow tank 33. A fifth glycol conduit 127 is united with the discharge coupling 114 of the heating jacket 110 and has remote branched ends 128. The branched ends of glycol conduit 127 are individually connected to the solenoid valves 125 and 126 in fluid supplying relation. A sixth glycol conduit 129 is borne by solenoid valve 125 and connected at its opposite end to the side wall 34 of the tallow tank 33 in communication with the interior 35 thereof. A heating coil 130 is fastened on the interior of the tallow tank in receiving relation to fluid from glycol conduit 129. 57

A heating coil 131 is extended circumferentially about the pump 45 to enhance heat transfer between the glycol transported through the coil and tallow transported through the pump. A seventh glycol conduit 132 is secured on the heating coil 130 within the tallow tank 33 in fluid receiving relation. Glycol conduit 132 is connected at its opposite end to the heating coil 131 of the pump 45 in fluid supplying relation. An eighth glycol conduit 133 is borne by solenoid valve 126 in receiving relation to fluid passed therethrough and is connected at its opposite end to the glycol conduit 132. Thus, the tallow tank 33 can be bypassed if desired by closing solenoid valve 125 and opening solenoid valve 126. A ninth glycol conduit 134 is mounted on the heating coil 131 of the pump 45. Glycol conduit 134 extends along the second tallow conduit 56 and into engagement with the side wall 77 of the glycol mixing tank 76 for discharge of the contents of the glycol conduit 134 into the interior of the mixing tank. The glycol conduits 95, 97, 100, 115, 127, 132, 133 and 134 are preferably, although not necessarily, individually enclosed in heat insulating conduits 140 extending substantially the entire lengths thereof to retain the heat of the fluid transported therealong. In the case of the ninth glycol conduit 134, the insulating conduit 140 thereabout preferably also extends about the second tallow conduit 56 so as to enhance heat transfer from the glycol conduit to the tallow conduit. Similarly, the heating coil 131 is preferably enclosed in a heat insulating housing 141 secured on the screw pump 45.

As previously noted, any suitable electrical system, not shown, can be employed to operate the various electrical components of the apparatus such as the mixing motor 39, drive motor 46, flow switch 59, flow meter 60, pressure switch 61, glycol heater 73, drive motor 81 and solenoid valves 125 and 126. Where such an electrical system is employed, it is preferably wired to the control panel for operation of the various electrical components of the apparatus therefrom. Also as previously noted the electrical system is preferably adapted for connection to the device 11 for control thereof from the control panel 21.

OPERATION

The operation of the described embodiment of the present invention and the method hereof are believed to be clearly apparent and are briefly summarized at this point. A carrier agent which is immiscible in the specific food product, in this case meat, at ambient temperature is deposited in the tallow tank 33. As previously noted, the carrier agent is preferably tallow, but can also be a similar fat, oil or the like. The tallow is deposited in the tank 33 through the open upper end 37 after removal of the lid 38. Tallow is readily available at most meat processing plants and is normally simply disposed of as a waste material. Tallow has been discovered to be uniquely effective in the practice of the method hereinafter to be described since tallow at ambient temperature is a congealed, nonflowable mass. However, when the temperature of tallow is raised to about 90° Fahrenheit or greater, it becomes liquefied.

A heat conductive fluid is prepared in the mixing tank 76. Any suitable fluid can be employed such as water, glycol or the like. In the preferred embodiment a mixture of glycol and water is prepared within the tank 76. With the valves 96 and 98 in open condition, the glycol pump 80 is activated from the control panel 21 to pump the glycol-water mixture, hereinafter referred to simply as "glycol", through conduits 95 and 97 and into the glycol heater 73. The glycol is heated to the preferred temperature by operation of the glycol heater as controlled from the control panel 21. The heated glycol then flows from the glycol heater through the glycol conduit 100 into the heating coil 101 within the metering control box 22. The glycol is propelled along the fourth glycol conduit 115 and into the heating jacket 110 where the glycol is circulated about the fourth tallow conduit 63 in heat transferring relation. The glycol is discharged from the heating jacket through conduit 127.

In the normal operating configuration, the solenoid valve 126 is closed and the solenoid valve 125 is opened by selective operation from the control panel 21. Thus, the glycol flows through solenoid valve 125, along glycol conduit 129 and into the heating coil 130 within the tallow tank 33. Each circuit of the glycol is completed by passage along conduit 132, through heating coil 131, upwardly along glycol conduit 134 and back into the mixing tank 76.

The temperature within the interior 35 of the tallow tank 33 is gradually raised from ambiency by continued circulation of the heated glycol through the heating coil 130. The temperature is raised sufficiently to allow the tallow to become temporarily liquefied. This occurs when the temperature of the tallow is raised to approximately 90° Fahrenheit or higher. The mixing motor 39 is operated to drive the mixing head 41 to mix the tallow and encourage liquefication. When the tallow has been converted temporarily to a liquid form, the desired marking agent or dye is deposited within the interior of the tank and intermixed with the tallow using the mixing motor 39. Of course, the specific formula for mixing the dye and tallow can be varied depending upon the precise effect desired. However, it has been found with the method and apparatus of the present invention that a proportional relationship of seventeen to twenty parts per million of dye to tallow is fully safisfactory and constitutes the preferred formulation due to the extremely small quantity of dye required. The dye should be one that is economical, that can either be dissolved or suspended in the liquefied tallow, and, of course, one that is approved for use by the United States Department of Agriculture. Such well known dyes as F D & C green #3, F D & C blue #1, F D & C blue #2, F D & C violet #1 and powdered charcoal are excellently suited to the purpose. Any of the proprietary dyes approved by the Administrator of the U.S. Department of Agriculture and having the above characteristics can be utilized.

When the temperature within the interior 35 of the tallow tank 33 has been raised to a temperature sufficient for liquefication of the tallow, it may be desired to have the heated glycol bypass the tallow tank. This is accomplished by opening the solenoid valve 126 and closing the solenoid valve 125. This diverts the glycol along glycol conduit 133. Such individual opening and closing of the solenoid valves 125 and 126 can be employed to maintain the desired temperature within the tallow tank.

The intermixed marking and carrier agents, in this case liquid tallow and dye, flow by gravity along conduit 55 and into the screw pump 45. The pump forces the mixture upwardly along conduit 56 through strainer 57 and along conduit 58 through the metering control box 22. The flow switch 59 detects the flow of the mixture through the tallow conduit 58 and the switch closes to activate the meat transporting system 12 of device 11. The pressure switch 61 operates only when pressure in the tallow conduit 58 reaches the predetermined upper limit to deactivate the meat transporting system. As previously noted, the flow meter 60 operates to indicate at the control panel 21 the quantity of the mixture being metered along the tallow conduit 58. The mixture is pumped along the conduit 63 through the heating jacket 45 and is injected into or on to the meat mass 14 through the injector 65.

In accordance with the method of the present invention, the meat mass 14 is maintained at or below ambient temperature during passage along the conduit 13. Therefore, injection of the liquid tallow dye mixture, which is thus temporarily miscible in the meat mass, causes the temperature of the mixture rapidly to return to ambience causing it to again become immiscible in the meat mass. This effect insures that the mixture is easily injected into the meat mass to form stripes, streaks or marking therein, but insures that the mixture does not become diffused throughout the meat mass as characteristic of prior art practices.

Therefore, a meat mass injected for purposes of denaturing in accordance with the method and apparatus of the present invention retains the striped, streaked or blotched appearance desired providing a striking visual contrast between the normal color of the meat and the color of the dye thereby insuring immediate visual identification. Since the tallow need only be used in very small quantities and is edible by animals, it does not interfere with subsequent use of the meat for the purposes for which it was intended. Furthermore, the method and apparatus offer a valuable use for substances heretofore considered to be waste materials and offer an inexpensive and highly effective method for denaturing food products.

Although the invention has been shown and described in what is conceived to be the most practical and preferred method and apparatus, it is recognized that departures may be made therefrom within the scope of the invention, which is not to be limited to the illustrative details disclosed.

Having described my invention what I claim as new and desire to secure by Letters Patent is:

1. A method for denaturing comminuted food which is unfit for human consumption by applying a dye to the food in streaks, the method comprising the steps of:

A. heating a carrier, which is normally immiscible with the food at ambient temperature, to a temperature elevated therefrom such that the carrier is temporarily converted to a liquid state;

B. mixing a dye, having a color distinguishable from said food and which is water soluble, with the carrier to form a liquid mixture thereof;

C. directing the food in a substantially continuous stream;

D. maintaining the food in the stream at substantially not greater than ambient temperature;

E. maintaining said mixture at a sufficiently elevated temperature to maintain the mixture in said liquid state; and F. applying the mixture to the food in the stream to form discrete streaks of the mixture on the food which are converted to a state immiscible with the food by reduction of the temperature of said mixture by the temperature of the food.

2. A method of marking a food product which is unfit for human consumption with a dye which is normally miscible with the food product at ambient temperature comprising:

A. heating a carrier, which is normally immiscible with the food product and the dye at ambient temperature, to a temperature elevated sufficiently to permit mixing of the dye therein;

B. mixing the dye and the carrier at the elevated temperature to form a mixture of said dye and carrier;

C. depositing the mixture on the food product in discrete areas of deposit; and

D. cooling the mixture to ambient temperature to minimize diffusion of the mixture in the food product.

3. The method of claim 2 wherein said carrier is a solid at ambient temperature and liquid when heated to said elevated temperature.

4. The method of claim 3 wherein the food product is maintained at ambient temperature during the depositing step so that the mixture is returned by said temperature of the food product to ambient temperature to form a solid by said depositing.

5. The method of claim 2 wherein the food product is comminuted meat and the dye is edible by animals.

6. The method of claim 5 wherein the carrier is tallow which is a solid at ambient temperature and a liquid when heated to the elevated temperature.

7. The method of claim 1 wherein said carrier is a solid at ambient temperature and liquid when heated to said elevated temperature.

8. The method of claim 1 wherein the food is comminuted meat and the dye is edible by animals.

9. The method of claim 1 wherein the carrier is tallow which is a solid at ambient temperature and a liquid when heated to the elevated temperature.

* * * * *

UNITED STATES PATENT AND TRADEMARK OFFICE
CERTIFICATE OF CORRECTION

PATENT NO. : 4,172,901

DATED : October 30, 1979

INVENTOR(S) : Soran

It is certified that error appears in the above—identified patent and that said Letters Patent are hereby corrected as shown below:

Column 6, line 17, delete "57".

Signed and Sealed this

Twelfth Day of February 1980

[SEAL]

Attest:

Attesting Officer

SIDNEY A. DIAMOND

Commissioner of Patents and Trademarks